United States Patent [19]

Nijhuis

[11] 4,338,700

[45] Jul. 13, 1982

[54] APPARATUS FOR ELECTRICALLY STUNNING ANIMALS TO BE SLAUGHTERED

[75] Inventor: Johan W. Nijhuis, Winterswijk, Netherlands

[73] Assignee: Machinefabriek G.J. Nijhuis B.V., Winterswijk, Netherlands

[21] Appl. No.: 147,827

[22] Filed: May 8, 1980

[30] Foreign Application Priority Data

May 10, 1979 [NL] Netherlands .......................... 7903681

[51] Int. Cl.³ ................................................ A22B 3/06
[52] U.S. Cl. ...................................................... 17/1 E
[58] Field of Search ........................................... 17/1 E

[56] References Cited

U.S. PATENT DOCUMENTS 3,377,649  4/1968  Rains ...................................... 17/1 E

FOREIGN PATENT DOCUMENTS 640728  1/1979  U.S.S.R. ................................. 17/1 E

Primary Examiner—Willie G. Abercrombie
Attorney, Agent, or Firm—Arnold, White & Durkee

[57] ABSTRACT

An apparatus is provided for electrically stunning animals to be slaughtered. Said apparatus comprises electrodes which are pivotable about horizontal axes and, in their initial position, extend downwardly into a V-shaped passageway formed between two parallel endless conveyors. Said electrodes are mounted within a frame which is movable in a direction coinciding with the direction of movement of the conveyors. Said frame is connected to a driving mechanism which is adapted to move the frame with substantially the same speed as the speed of the conveyors and which starts its movement upon closure of the circuit between the electrodes by an animal to be stunned.

12 Claims, 2 Drawing Figures

APPARATUS FOR ELECTRICALLY STUNNING ANIMALS TO BE SLAUGHTERED

CROSS-REFERENCE TO RELATED APPLICATIONS

This application discloses subject matter related to application, Ser. No. 905,371, filed May 12, 1978, now abandoned; co-pending application, Ser. No. 147,826, filed May 8, 1980; co-pending application, Ser. No. 148,033, filed May 8, 1980; co-pending application, Ser. No. 148,034, filed May 8, 1980; co-pending application, Ser. No. 161,298, filed June 20, 1980; and co-pending application, Ser. No. 202,322, filed Oct. 30, 1980.

BACKGROUND OF THE INVENTION

The invention relates generally to an apparatus for electrically stunning animals to be slaughtered in particular pigs. More specifically, the invention relates to apparatus comprising two endless conveyors. Which are operable to run parallel to each other and at a synchronized rate and are positioned to form a substantially V-shaped passageway therebetween. A pair of electrodes or sets of electrodes are provided and are adapted to engage the head of the animal to be stunned. The electrodes are further adapted to extend downwardly toward said V-shaped passageway in a spaced relationship to each other and are to clear said passageway.

One embodiment of an electrical stunning apparatus is disclosed in Applicant's prior application, Ser. No. 905,371, which is based upon Dutch patent application 77.05519 laid open to public inspection. In the above apparatus disclosed in applicant's prior application, two sets of electrodes are provided and are operable to pivot about horizontal shafts arranged above the conveyors. The electrodes are adapted to engage the head of the animal to be stunned and, upon engagement with the head of the animal, provide a jolt of current through the head of the animal, thus causing the stunning.

In stunning animals it is of utmost importance that the stunning is induced immediately by a jolt of intense current lasting a short time. A jolt of current of insufficient strength due to a bad contact, particularly if the electrical contact is intermittent or interrupted, may lead to a stress condition in the animal resulting in a change in the pH value of the meat to an undesired value. It may also cause muscular contractions, internal bleeding, and bone breakage which, in turn, results in a depreciation of the value of the meat.

Moreover, it is necessary that such apparatus provide high production levels for example on the order of 600 pigs per hour. Such production is possible if a short stunning time is utilized, provided that, an excellent contact is assured during this short time.

In the apparatus disclosed in applicant's prior application, the head of the animal engages the first electrode, or the first set of electrodes, which pass across the head of the animal. When the animal thereupon engages a second electrode, there will occur a passage of current capable of causing the stunning. To achieve a high production level, the conveyors move at such a rate that during the short period of current flow the animal will be displaced over a considerable distance, for example a distance of 30 cm (11.81 inches). The corresponding variable displacement of the electrodes with respect to the head of the animal causes the contact resistance between the electrode surface and the head of the animal to vary. The variations in the contact resistance may result in an unevenness in the stunning. In view of the length of the path along which the electrodes may pass across the head, it may be possible that the electrodes first engaging the head will engage the body too far behind the head during the period of current flow whereby the current may follow a less desired path during the period of current flow.

One feature of the present invention is that it improves upon this situation.

SUMMARY OF THE INVENTION

In accordance with the present invention, this feature is achieved by mounting the electrodes present in a frame, said frame being arranged above said conveyors and being operable to move in the longitudinal direction of the conveyors. Said frame is operably connected to a driving mechanism which imparts a reciprocating movement to said frame so that the rate of the forward movement of the frame is the same as or somewhat lower than the rate of the movement of the conveyors.

At the moment the electrodes have acquired the proper position on the head of the animal, the electrodes will move at a rate substantially equal to that of the conveyors (and thus the electrodes will move with the head of the animal) and will consequently maintain the contact position on the head. In case of a very slight relative movement between the electrodes and the head of the animal, the position of the electrodes on the head will only charge slightly during the flow of current. This assures a proper contact and consequently a proper quick stunning of the animal during the period of the current flow.

The same result may be achieved by interrupting the movement of the conveyors during the flow of current. This is undesirable and would lead to a troublesome operation and a slowdown thereof.

Preferably, the operation of the drive mechanism or drive means is dependent upon the closure of the current circuit between the successive electrodes, that is, at the same moment the current starts to flow, the drive mechanism is put into operation. The closure of the current circuit between the electrodes may be used to initiate movement of the frame in the direction of the movement of the conveyors. A time switch may be used to control the movement of the frame. The movement of the frame will be reversed at the end of the forward stroke of the frame. In other words, the framw will reciprocate back to the initial position after stunning is completed.

Animals arriving in such an apparatus sense danger and are distressed and disquiet, which in itself is already of detriment to the quality of the meat. Hence, it is desirable that the movable frame, including the electrodes and the drive mechanism, operates with the least amount of noise as is possible. In the presently preferred embodiment, this is achieved by using a hydraulic cylinder as the drive mechanism. The utilization of such a hydraulic drive mechanism, moreover, results in an additional advantage in that it permits an easy adaptation to the desired rate of movement.

According to the present invention, the frame may furthermore be provided with runners having a V-shaped running surface, said runners being disposed between top and bottom rails having a V-shaped cross section. Such a guide operates effectively and provides the further advantage of withstanding blows in an upward direction which may be caused by the head of the animal.

Other guide arrangements may be used. However it is important that the guide or running surfaces of the rails or of the runners are either composed of or are covered with a soundproof material.

It should be understood that the concept of the present invention includes the embodiment wherein the electrodes are arranged transversely to the direction of movement of the conveyors rather than so that the flow of current occurs through the head in a transverse direction as is, for example, the case for a pair of manually operated stunning tongs.

BRIEF DESCRIPTION OF THE DRAWING

The invention will now be described in further detail with reference to the appended drawing, in which.

DESCRIPTION OF THE PRESENTLY PREFERRED EMBODIMENT

Figure 2:
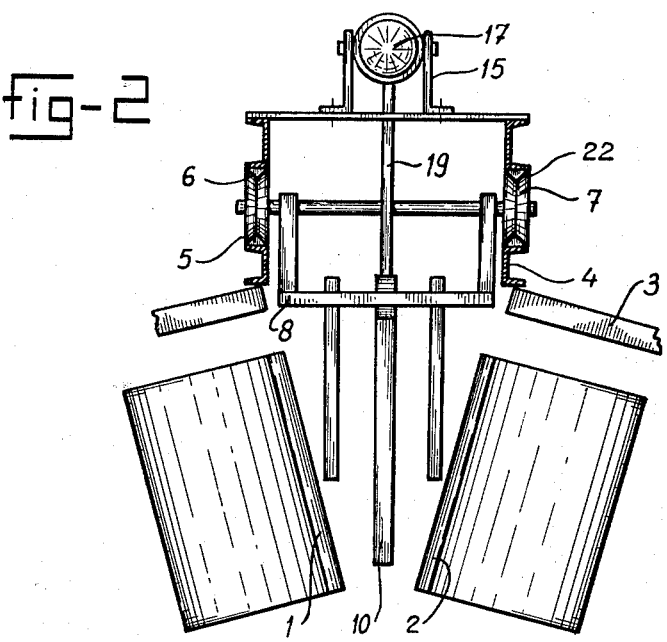
FIG. 2 is an end view of the apparatus shown in FIG. 1, with the conveyors have been shown diagrammatically.

FIG. 2 diagrammatically shows two endless conveyors 1 and 2, which have been positioned to form a substantially V-shaped passageway therebetween. These conveyors are arranged within a frame 3, the top parts of which have been represented. A frame 4 has been fastened to said frame 3, said frame 4 comprising lower and upper members having U-shaped cross sections, the flanges of which face each other. The frame 4 is provided with V-shaped rail surfaces 5 and 6.

Figure 1:
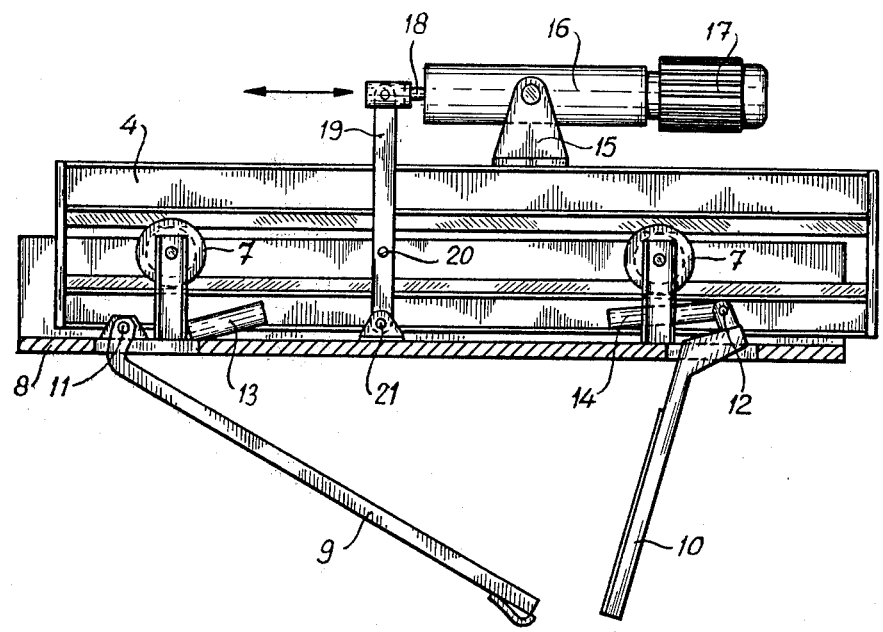
FIG. 1 is a side elevation of the apparatus, according to the present invention, in which the conveyors have been omitted.

Between the rail surfaces 5 and 6 are accommodated runners 7. In the presently preferred embodiment, four runners support frame 8 from which sets of electrodes 9 and 10 are suspended. Said sets of electrodes are mounted to pivot about horizontal shafts 11 and 12 (FIG. 1). Each set of electrodes 9 and 10 is coupled to spring means 13 and 14, respectively.

Mounted on the frame 4 are supports 15 which support driving means 16, such as a hydraulic cylinder and a motor driven pump 17. A piston rod 18, within cylinder 16 is pivotably connected to a lever 19. The lever 19 has a fixed pivot or fulcrum point 20 in the frame 4 and is connected by a hinge or pin to the frame 8 at 21.

When the piston rod 18 is extended, i.e., moves to the left-hand side in FIG. 1, the frame 8 will move to the right-hand side, this being the direction of movement of the conveyors 1 and 2.

Should be appreciated that other electrode arrangements, such as a side-by-side arrangement, may be used and still remain within the contemplation of the present invention.

In the presently preferred embodiment, the V-shaped guide rails 5 and 6 are coated with a teflon layer 22 (FIG. 2) which aids in noise reduction. Other soundproofing materials may be used.

When a flow of current occurs between the electrode(s) and the electrode(s) 9, or after some time delay, a normal switching circuit (not shown) switches on the drive motor 17, whereby the hydraulic cylinder 16 extends the piston rod at such a rate that the frame 8 moves at a similar rate substantially equal to the rate of movement of the conveyors 1 and 2.

The reversal of the movement of the piston rod 18, and thus the frame 8, may be controlled by a time switch or by a switch mounted on a stop.

At a desired production level of 600 pigs per hour, six seconds are available per animal, one to four seconds of which are required, for the stunning leaving a sufficient amount of time for the return movement of the frame 8.

It is to be understood that the invention will admit of other embodiments. The description of the presently preferred embodiment is given only to facilitate understanding of the invention by those skilled in the art and should not be construed as limiting the invention.

I claim:

1. An apparatus for electrically stunning animals to be slaughtered, comprising:
    two endless conveyors, said conveyors being operable to run parallel to each other and at a synchronized rate and being positioned to form a substantially V-shaped passageway therebetween; and
    first and second electrodes, said electrodes being adapted to engage the head of the animal to be stunned as the animal is moving on the conveyors, said electrodes being further adapted to extend downwardly toward said V-shaped passageway and to clear said passageway, said electrodes being mounted in a frame, said frame being arranged above said conveyors and being operable to move in a direction generally parallel to the conveyors, said frame being operably connected to a drive mechanism which is adapted to impart a reciprocating movement to said frame as the animal is moving on the conveyors, such that the rate of forward movement of the electrodes mounted in the frame substantially corresponds to the rate of movement of the animal moving on the conveyors.

2. The apparatus according to claim 1, wherein operation of the drive mechanism is actuated by sensing the closure of a current circuit between the electrodes.

3. The apparatus according to claim 2, wherein the closure of the current circuit between the electrodes is conducive to switching in the movement of the frame in the direction of movement of the conveyors, said movement of the frame being reversed at the end of the stroke of the frame.

4. The apparatus according to claim 1, 2, or 3, wherein the drive mechanism comprises a hydraulic cylinder.

5. The apparatus according to claim 1, 2, or 3, wherein the frame is provided with runners having a V-shaped running surface, said runners running between top and bottom rails having a V-shaped cross section.

6. The apparatus according to claim 1, 2, or 3, wherein the running surface of the runners is covered with a soundproof material.

7. The apparatus according to claim 5, wherein the rails are covered with a soundproof material.

8. The apparatus according to claim 4, wherein the frame is provided with runners having a V-shaped running surface, said runners being disposed between top and bottom rails having a V-shaped cross section.

9. The apparatus according to claim 8, wherein the running surface of the runners is covered with a soundproof material.

10. The apparatus according to claim 8, wherein the rails are covered with a soundproof material.

11. The apparatus according to claim 3, wherein the closure of the current circuit between the electrodes activates a time switch which is adapted to control the reciprocating movement of the frame.

12. An apparatus for electrically stunning animals, comprising:

two conveyors forming a V-shaped restrainer, the conveyors being operable to run at a synchronized rate, the conveyors being adapted to restrain and transport an animal to be stunned;

a frame disposed so that the frame may be moved reciprocably in a direction generally parallel to the direction of the conveyors, the frame being adapted to support electrodes and being adapted to move electrodes in a direction and at a rate generally corresponding to the movement of the animal transported by the conveyors;

first and second electrodes mounted on the frame, the electrodes being adapted to engage the head of the animal as the animal is moving on the conveyors;

a drive mechanism, the drive mechanism being adapted to move the frame, the drive mechanism being actuated by sensing the presence of an animal between the electrodes;

the conveyors, the frame, the electrodes and the drive mechanism being mutually cooperable, upon sensing the presence of an animal between the electrodes, to move the electrodes in a direction and at a rate generally corresponding to the movement of the animal transported by the conveyors so that electrical contact between the animal and the electrodes may be maintained for a sufficient period of time to permit stunning without stopping the conveyors; and, the frame, the electrodes and the drive mechanism being mutually cooperable, upon completion of stunning of an animal, to reverse and return to an initial position in readiness for the next animal.

* * * * *

UNITED STATES PATENT AND TRADEMARK OFFICE
CERTIFICATE OF CORRECTION

PATENT NO. : 4,338,700
DATED : July 13, 1982
INVENTOR(S) : Johan W. Nijhuis

It is certified that error appears in the above—identified patent and that said Letters Patent is hereby corrected as shown below:

Column 1, line 20, change "conveyors. Which" to -- conveyors, which --;
   line 28, after "are" insert -- adapted --;
   line 52, insert a comma after "levels";
   line 52, insert a comma after "example";
   line 65, insert a comma after "ample";

Column 2, line 14, delete "present";
   line 30, change "charge" to -- change --;
   line 48, change "framw" to --frame --.

Column 3, line 5, delete "of" (first occurrence).
   line 10, after "than" insert -- in a consecutive manner --;
   line 46, after "16" insert a comma;
   line 53, change "Should" to -- It should --;
   line 62, after "trode(s)" (first occurrence), insert -- 10 --.

Column 4, line 6, delete the comma.

Signed and Sealed this

Eighteenth Day of January 1983

[SEAL]

Attest:

GERALD J. MOSSINGHOFF

Attesting Officer      Commissioner of Patents and Trademarks